United States Patent
Nishimiya et al.

(10) Patent No.: US 9,709,288 B2
(45) Date of Patent: Jul. 18, 2017

(54) AIR-CONDITIONING SYSTEM

(71) Applicants: Kazunobu Nishimiya, Tokyo (JP); Atsuhiro Yabuta, Tokyo (JP)

(72) Inventors: Kazunobu Nishimiya, Tokyo (JP); Atsuhiro Yabuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 429 days.

(21) Appl. No.: 14/378,887

(22) PCT Filed: Apr. 12, 2013

(86) PCT No.: PCT/JP2013/061044
§ 371 (c)(1),
(2) Date: Aug. 14, 2014

(87) PCT Pub. No.: WO2013/161584
PCT Pub. Date: Oct. 31, 2013

(65) Prior Publication Data
US 2015/0032269 A1  Jan. 29, 2015

(30) Foreign Application Priority Data
Apr. 23, 2012 (JP) ................................. 2012-097471

(51) Int. Cl.
*F24F 11/00* (2006.01)
*G05D 23/19* (2006.01)
(Continued)

(52) U.S. Cl.
CPC .......... *F24F 11/0009* (2013.01); *F24F 3/065* (2013.01); *F24F 11/008* (2013.01);
(Continued)

(58) Field of Classification Search
None
See application file for complete search history.

(56) References Cited

U.S. PATENT DOCUMENTS 6,269,650 B1 * 8/2001 Shaw ..................... F24F 11/008
236/44 C
2003/0010047 A1 * 1/2003 Shimoda ................. F25B 13/00
62/228.3
(Continued)

FOREIGN PATENT DOCUMENTS

JP 2002-147823 A 5/2002
JP 2003-130430 A 5/2003
(Continued)

OTHER PUBLICATIONS

Extended European Search Report issued Feb. 16, 2016 in the corresponding EP application No. 13782380.3.
(Continued)

*Primary Examiner* — Isaac T Tecklu
(74) *Attorney, Agent, or Firm* — Posz Law Group, PLC

(57) ABSTRACT

An air-conditioning system includes: an air-conditioning apparatus in which indoor units are connected to an outdoor unit; a conveying fan; and control means for controlling the air-conditioning apparatus and the conveying fan on the basis of a target evaporating temperature. The control means resets an upper limit of the target evaporating temperature when: a control determination temperature difference which is a difference between a set temperature and a temperature of an air-conditioned space is within a predetermined range; a humidity of the air-conditioned space is equal to or lower than a predetermined value; and a thermo-ON indoor unit and a thermo-OFF indoor unit are present together in the same air-conditioned space.

12 Claims, 5 Drawing Sheets

(51) Int. Cl.
*F24F 3/06* (2006.01)
*F24F 7/007* (2006.01)

(52) U.S. Cl.
CPC ...... *F24F 11/0012* (2013.01); *F24F 11/0015* (2013.01); *G05D 23/1917* (2013.01); *F24F 7/007* (2013.01)

(56) References Cited

U.S. PATENT DOCUMENTS

| | | | | |
|---|---|---|---|---|
| 2006/0254294 A1* | 11/2006 | Shimamoto | ............. | F24F 3/065 62/238.7 |
| 2007/0095084 A1* | 5/2007 | Park | ................ | F24F 11/008 62/197 |
| 2007/0137225 A1* | 6/2007 | Shindo | ................ | F24F 3/065 62/160 |
| 2007/0137833 A1* | 6/2007 | Kang | ................ | B60H 1/00064 165/42 |
| 2010/0125370 A1* | 5/2010 | Baba | ................ | F24F 11/0086 700/276 |
| 2010/0218527 A1* | 9/2010 | Kitagishi | ................ | F24F 11/008 62/228.5 |
| 2010/0269521 A1* | 10/2010 | Moore | ................ | F24F 3/1405 62/91 |
| 2010/0293976 A1* | 11/2010 | Tsutsumi | ................ | F24F 3/1405 62/176.6 |
| 2010/0300125 A1* | 12/2010 | Cikanek | ................ | B60H 1/3211 62/115 |
| 2012/0198874 A1* | 8/2012 | Yamashita | ................ | F24F 3/06 62/160 |
| 2013/0227976 A1* | 9/2013 | Yamashita | ................ | F24F 3/065 62/126 |
| 2013/0233008 A1* | 9/2013 | Yamashita | ................ | F25B 1/10 62/196.1 |
| 2014/0033753 A1* | 2/2014 | Lu | ................ | F25B 49/02 62/190 |
| 2014/0033754 A1* | 2/2014 | Hatomura | ................ | F25B 13/00 62/190 |
| 2014/0090406 A1* | 4/2014 | Ishikawa | ................ | F25B 47/02 62/82 |
| 2014/0190191 A1* | 7/2014 | Slessman | ................ | H05K 7/20836 62/91 |
| 2014/0230479 A1* | 8/2014 | Ito | ................ | F24F 3/1429 62/271 |
| 2014/0238061 A1* | 8/2014 | Shimamoto | ................ | F25B 13/00 62/160 |
| 2014/0318734 A1* | 10/2014 | Shimamoto | ................ | F25D 17/02 165/11.1 |
| 2015/0013365 A1* | 1/2015 | Yabuta | ................ | F24F 11/0012 62/190 |
| 2015/0034293 A1* | 2/2015 | Takayama | ................ | F25B 13/00 165/207 |

FOREIGN PATENT DOCUMENTS

| | | |
|---|---|---|
| JP | 2005-226976 A | 8/2005 |
| JP | 2010-261713 A | 11/2010 |
| JP | 2011-075179 A | 4/2011 |
| JP | 2012-013389 A | 1/2012 |
| WO | WO03/029728 A1 | 4/2003 |

OTHER PUBLICATIONS

Office Action mailed Oct. 6, 2015 in the corresponding JP application No. 2014-512465 (with English translation).
International Search Report of the International Searching Authority mailed Jun. 18, 2013 for the corresponding international application No. PCT/JP2013/061044 (and English translation).

* cited by examiner

| | FORCIBLE THERMO-ON INDOOR UNIT TOTAL CAPACITY | | |
|---|---|---|---|
| | 5 | 10 | 20 |
| THERMO-ON INDOOR UNIT TOTAL CAPACITY  5 | 20.25 | 22.5 | 24.3 |
| 10 | 18 | 20.25 | 22.5 |
| 20 | 16.2 | 18 | 20.25 |

AIR-CONDITIONING SYSTEM

CROSS REFERENCE TO RELATED APPLICATIONS

This application is a U.S. national stage application of International Application No. PCT/JP2013/061044 filed on Apr. 12, 2013, which claims priority to JP 2012-097471 filed on Apr. 23, 2012, the disclosures of which are incorporated by reference.

TECHNICAL FIELD

The present invention relates to an aft-conditioning system which includes an air-conditioning apparatus including at least one outdoor unit and two or more indoor units connected to the outdoor unit and particularity reduces energy consumption to enable air-conditioning to be efficiently performed.

BACKGROUND ART

Hitherto, an air-conditioning system has existed which includes an air-conditioning apparatus including at least one outdoor unit and two or more indoor units connected to the outdoor unit. Among such air-conditioning systems, there is an air-conditioning system in which an evaporating temperature of a refrigerant at which at least a predetermined amount of dehumidification is obtained at an indoor heat exchanger of an indoor unit during cooling operation is set as an upper limit evaporating temperature, and an evaporating temperature of the refrigerant at the indoor heat exchanger is controlled in a range of equal to or lower than the upper limit evaporating temperature (e.g., see Patent Literature 1).

CITATION LIST

Patent Literature

Patent Literature 1: Japanese Unexamined Patent Application Publication No. 2011-75179 (Pages 7 to 9, etc.)

SUMMARY OF INVENTION

Technical Problem

In an air-conditioning system which controls an evaporating temperature of a refrigerant at an indoor heat exchanger as described in Patent Literature 1, among individual evaporating temperatures which are set for respective indoor units such that a predetermined amount of dehumidification is obtained, the lowest value is set as an upper limit evaporating temperature. Thus, when a load on each indoor unit differs greatly, cooling is excessive at an indoor unit on which the load is small. Due to this point, there is a possibility that energy saving and comfort are deteriorated.

In addition, the load on each indoor unit is different from each other. Thus, even when there is an indoor unit with which it is unnecessary to perform air-conditioning, the indoor unit with which air-conditioning is unnecessary is also operated, thus cooling is made excessive. Also due to this point, there is a possibility that energy saving and comfort are deteriorated.

Furthermore, since the upper limit evaporating temperature is set such that a predetermined amount of dehumidification is obtained, even when dehumidification is unnecessary, dehumidification is performed. Thus, there is a possibility that excessive dehumidification is caused and comfort is deteriorated.

Moreover, since the upper limit evaporating temperature is set such that a predetermined amount of dehumidification is obtained, when dehumidification is unnecessary and a load is small, the air-conditioning capacity becomes excessive. Also due to this point, there is a possibility that energy saving and comfort are deteriorated.

The present invention has been made in order to solve at least one of the above-described problems and it is an object of the present invention to provide an air-conditioning system which enables air-conditioning of an air-conditioned space with reduced energy consumption even when the air-conditioned space is dehumidified by air-conditioning so that the humidity of the air-conditioned space is reduced.

Solution to Problem

An air-conditioning system according to the present invention includes: an air-conditioning apparatus in which two or more indoor units are connected to at least one outdoor unit; a conveying fan conveying conditioned air; and control means configured to control the air-conditioning apparatus and the conveying fan on a basis of a preset target evaporating temperature. Each of the indoor units performs thermo-ON/thermo-OFF in accordance with a suction temperature. The control means resets an upper limit of the target evaporating temperature when: a control determination temperature difference which is a difference between a set temperature and a temperature of an air-conditioned space is within a predetermined range; a humidity of the air-conditioned space is equal to or lower than a predetermined value; and a thermo-ON indoor unit and a thermo-OFF indoor unit are present together in the same air-conditioned space.

Advantageous Effects of Invention

According to the air-conditioning system according to the present invention, it is possible to prevent excessive air-conditioning (cooling and dehumidification), it is possible to reduce energy consumption to achieve an energy saving effect, and it is possible to improve comfort in the air-conditioned space.

DESCRIPTION OF EMBODIMENTS

Embodiment 1

An air-conditioning system according to Embodiment 1 of the present invention includes an air-conditioning apparatus including at least one outdoor unit and two or more indoor units connected to the outdoor unit. In addition, the air-conditioning system according to Embodiment 1 of the present invention includes, in addition to the air-conditioning apparatus, a conveying fan which conveys conditioned air, a temperature sensor which measures a temperature, and a humidity sensor which measures humidity. These components are connected to each other via a refrigerant pipe and a communication line. For example, the temperature sensor and the humidity sensor are disposed at at least any one of an air inlet of each indoor unit or a cooling target, and data obtained by the sensors is communicated through the communication line. Also, the air-conditioning system according to Embodiment 1 of the present invention includes means which resets a target evaporating temperature on the basis of the data obtained by these sensors and performs control.

<<Equipment Configuration>>

Figure 1:
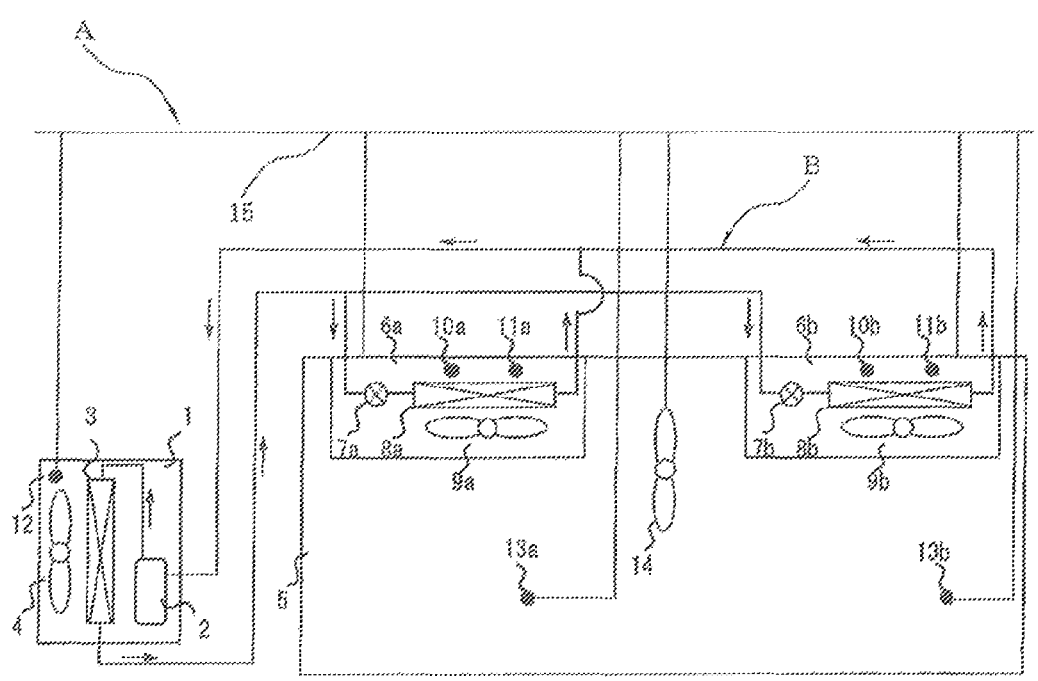
FIG. 1 is a schematic configuration diagram showing a schematic configuration of an air-conditioning system according to Embodiment 1 of the present invention.

A configuration of the air-conditioning system A according to Embodiment 1 of the present invention will be described with reference to FIG. 1. FIG. 1 is a schematic configuration diagram showing a schematic configuration of the air-conditioning system A according to Embodiment 1 of the present invention. In FIG. 1, a flow of a refrigerant during cooling operation of the air-conditioning apparatus is shown by arrows. In addition, in FIG. 1 and later-described figures, components designated by the same reference signs are the same or their equivalents, and this is common throughout the specification.

As shown in FIG. 1, the air-conditioning system A includes an air-conditioning apparatus B including at least one outdoor unit 1 and two indoor units (indoor units 6a and 6b) connected in parallel to the outdoor unit 1; a conveying fan 14 which is provided in the same air-conditioned space 5 and conveys conditioned air; temperature sensors (temperature sensors 10a and 10b) which measure a temperature within the air-conditioned space 5; and humidity sensors (humidity sensors 11a and 11b) which measure a humidity within the air-conditioned space 5.

The outdoor unit 1 includes, for example, a compressor 2 which compresses the refrigerant and circulates the refrigerant within a refrigerant path; an outdoor heat exchanger 3 which exchanges heat between outdoor air and the refrigerant discharged from the compressor 2 or the refrigerant sucked into the compressor 2; and an outdoor fan 4 which accelerates the heat exchange of the outdoor heat exchanger 3 by taking outdoor air into the outdoor unit and discharging the outdoor air. In addition, the outdoor unit 1 includes control means 12 which resets a target evaporating temperature on the basis of a control state and data obtained by various sensors and performs control.

The indoor unit 6a includes, for example, an indoor electronic expansion valve 7a which adjusts a refrigerant flow rate; an indoor heat exchanger 8a which exchanges heat between indoor air and the refrigerant which is reduced in pressure by the indoor electronic expansion valve 7a or the refrigerant discharged from the compressor 2; an indoor fan 9a which accelerates the heat exchange of the indoor heat exchanger 8a by taking air within the air-conditioned space 5 into the indoor unit 6a and discharging the air and conveys air for air-conditioning the air-conditioned space 5 into the air-conditioned space; the temperature sensor 10a; and the humidity sensor 11a.

The indoor unit 6b includes an indoor electronic expansion valve 7b which adjusts a refrigerant flow rate; an indoor heat exchanger 8b which exchanges heat between indoor air and the refrigerant which is reduced in pressured by the indoor electronic expansion valve 7b or the refrigerant discharged from the compressor 2; an indoor fan 9b which accelerates the heat exchange of the indoor heat exchanger 8b by taking air within the air-conditioned space 5 into the indoor unit 6b and discharging the air and conveys air for air-conditioning the air-conditioned space 5 into the air-conditioned space; the temperature sensor 10b; and the humidity sensor 11b.

In addition, the air-conditioning system A includes remote controls (remote controls 13a and 13b) which are connected to the air-conditioning apparatus B wirelessly or by a wire and provides various instructions (e.g. an operation instruction, a stop instruction, a set temperature instruction, a wind direction instruction, an air volume instruction, etc.) from a user to the air-conditioning apparatus B.

The compressor 2, the outdoor heat exchanger 3, the indoor electronic expansion valves 7a and 7b, and the indoor heat exchangers 8a and 8b are connected to each other by pipes to form a refrigerant circuit of the air-conditioning apparatus B. In FIG. 1, a flow of the refrigerant during cooling operation is shown by arrows. In the case of performing heating operation, the flow of the refrigerant is opposite to that during cooling operation.

In addition, the outdoor unit 1, the indoor units 6a and 6b, the remote controls 13a and 13b, and the conveying fan 14 are connected to each other by a communication line 15 in order to perform communication of control signals.

The compressor 2 is configured as a positive displacement compressor capable of varying an operation capacity (frequency). A control method for varying the operation capacity is, for example, a method by driving of a motor controlled by an inverter or a method using a slide valve. In FIG. 1, a state where only one compressor 2 is provided is shown as an example, but the present invention is not limited to this, and two or more compressors may be connected in parallel or in series.

The outdoor heat exchanger 3 may be configured, for example, as a cross fin type fin-and-tube heat exchanger including a heat-transfer pipe and a large number of fins. It should be noted that the outdoor heat exchanger 3 is not limited to the fin-and-tube heat exchanger, and may be configured as a plate type heat exchanger in which a large number of thin plates are aligned at intervals, a peripheral portion is sealed, and spaces formed between each thin plate are formed alternately as a refrigerant flow path and a water flow path. As the outdoor heat exchanger 3, two or more heat exchangers may be connected in parallel or in series. Furthermore, the outdoor heat exchanger 3 may be configured as a heat pipe type heat exchanger, a micro channel heat exchanger, a shell-and-tube heat exchanger, a double tube heat exchanger, or the like.

The opening degrees of the indoor electronic expansion valves 7a and 7b are controlled by the control means 12, thereby performing adjustment of a flow rate of the refrigerant flowing within the refrigerant circuit, or the like.

Each of the indoor heat exchangers 8a and 8b may be configured, for example, as a cross fin type fin-and-tube heat exchanger including a heat-transfer pipe and a large number of fins. It should be noted that each of the indoor heat exchangers 8a and 8b is not limited to the fin-and-tube heat exchanger, and may be configured as a plate type heat exchanger in which a large number of thin plates are aligned at intervals, a peripheral portion is sealed, and spaces formed between each thin plate are formed alternately as a refrigerant flow path and a water flow path. As each of the indoor heat exchangers 8a and 8b, two or more heat exchangers may be connected in parallel or in series. Furthermore, each of the indoor heat exchangers 8a and 8b may be configured as a heat pipe type heat exchanger, a micro channel heat exchanger, a shell-and-tube heat exchanger, a double tube heat exchanger, or the like.

Examples of the refrigerant used in the air-conditioning apparatus B include, but not limited to, HFC (hydrofluorocarbon) refrigerants such as R410A, R407C, and R404A, HCFC (hydrochlorofluorocarbon) refrigerants such as R22 and R134a, and natural refrigerants such as hydrocarbon and helium, and a refrigerant other than the above may be used as long as it has the same refrigerant action.

<<Flow of Refrigerant During Cooling Operation of Air-Conditioning Apparatus B>>

The flow of the refrigerant during cooling operation of the air-conditioning system A according to Embodiment 1 of the present invention will be described with reference to FIG. 1.

A gas refrigerant compressed by the compressor 2 into a high-temperature and high-pressure refrigerant flows into the outdoor heat exchanger 3 that serves as a condenser. The gas refrigerant having flowed into the outdoor heat exchanger 3 condenses and liquefies by heat exchange action with outdoor air supplied by the outdoor fan 4. In other words, the high-temperature and high-pressure gas refrigerant exchanges heat with the outdoor air and cooled into a low-temperature liquid refrigerant at the outdoor heat exchanger 3. The low-temperature liquid refrigerant flows out from the outdoor unit 1 and flows into each of the indoor units 6a and 6b.

The low-temperature liquid refrigerant having flowed into the indoor units 6a and 6b is reduced in pressure at the indoor electronic expansion valves 7a and 7b into a low-temperature and low-pressure liquid refrigerant and flows into the indoor heat exchangers 8a and 8b. The low-temperature and low-pressure liquid refrigerant having flowed into the indoor heat exchangers 8a and 8b evaporates by heat exchange action with indoor air supplied by the indoor fans 9a and 9b, to be a low-pressure gas refrigerant. In other words, the low-temperature and low-pressure liquid refrigerant receives heat from the indoor air at the indoor heat exchangers 8a and 8b to be a low-pressure gas refrigerant. At that time, the indoor air is cooled and conveyed to the air-conditioned space 5 by the indoor fans 9a and 9b to cool the air-conditioned space 5. Then, the low-pressure gas refrigerant returns to the compressor 2 again.

<<Control of Air-Conditioning System A>>

Figure 2:
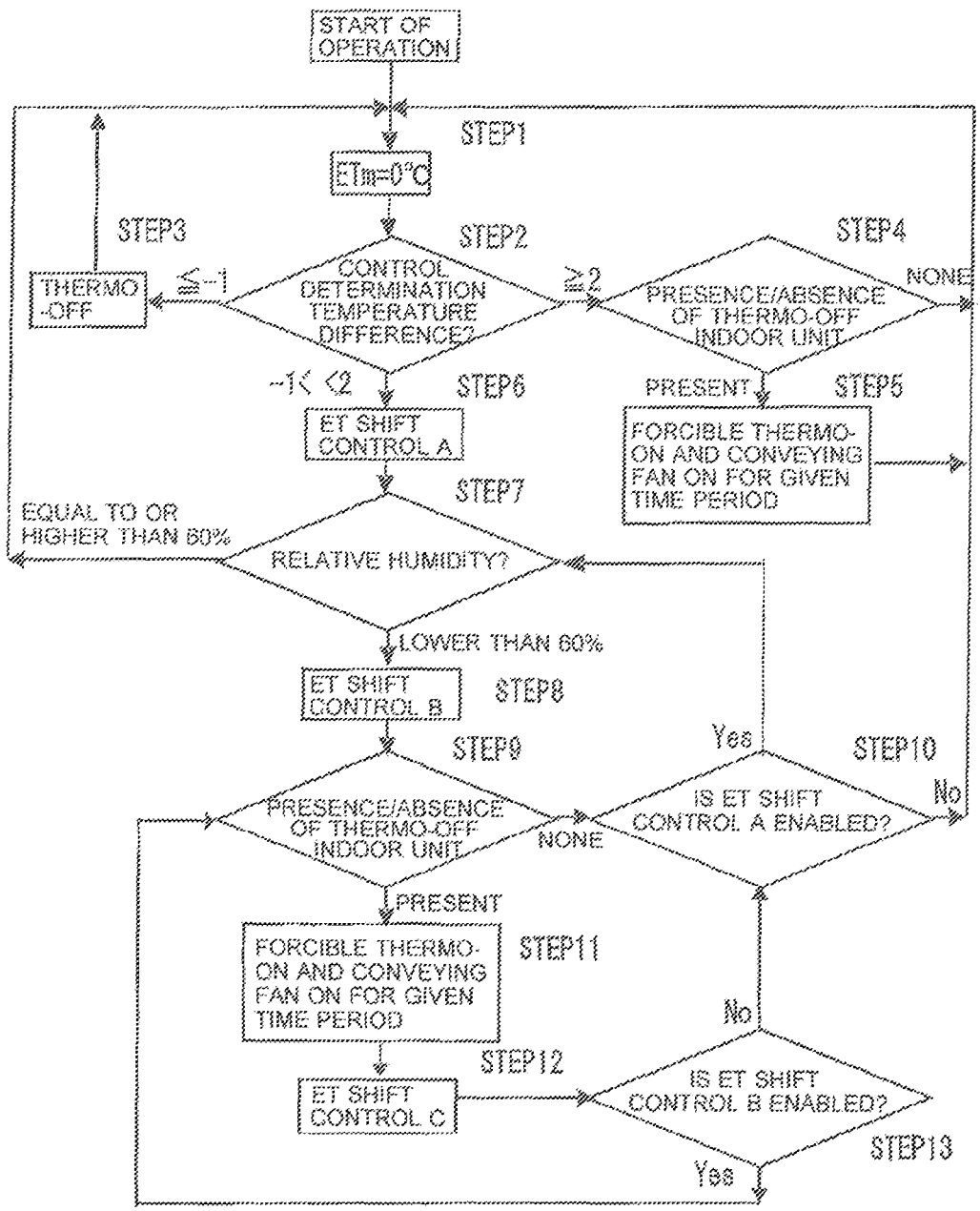
FIG. 2 is a flowchart showing a control flow of the air-conditioning system according to Embodiment 1 of the present invention.
Figures 3, 4:
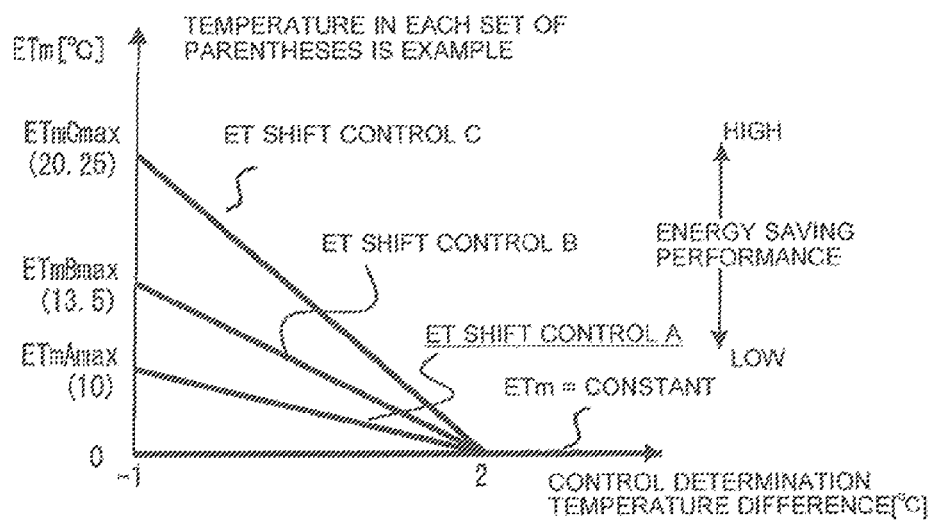
FIG. 3 is a graph showing a relationship between a control temperature difference and ETm in each control of the air-conditioning system according to Embodiment 1 of the present invention.
FIG. 4 is a table showing an example when ETmCmax of the air-conditioning system according to Embodiment 1 of the present invention is reset.

Control of the air-conditioning system A will be described. FIG. 2 is a flowchart showing the control flow of the air-conditioning system A. FIG. 3 is a graph showing a relationship between a control temperature difference and ETm in each control. In FIG. 3, the horizontal axis indicates a control determination temperature difference [degree(s) C.], and the vertical axis indicates ETm [degree(s) C.]. It should be noted that the operation mode of the air-conditioning apparatus B is cooling operation.

By the remote controls 13a and 13b being operated by the user, the control means 12 starts the cooling operation of the air-conditioning apparatus B. Here, the case where a target temperature (hereinafter, a set temperature) within the air-conditioned space 5 is 27 degrees C. is shown as an example.

In STEP 1, the control means 12 executes the cooling operation with a target evaporating temperature (hereinafter, ETm) as a constant temperature (e.g., 0 degrees C.).

In STEP 2, the temperature differences between the temperature sensors 10a and 10b and the set temperature(= (detected temperature of the temperature sensor)−(set temperature)) are determined. Each temperature difference is referred to as control determination temperature difference. It should be noted that when the temperature differences of the indoor units 6a and 6b are different from each other, control is performed on the basis of the larger one of the temperature differences in order to prevent capacity insufficiency (non-cooling). If the control means 12 determines that the control determination temperature difference is minus to some extent (the set temperature is higher than the temperature sensor. For example, −1 degree C.), the control means 12 shifts to a process of STEP 3.

In STEP 3, in order to prevent excessive cooling, the control means 12 causes the indoor unit to perform thermo-OFF to eliminate its air-conditioning capacity.

On the other hand, if the control means 12 determines that the control determination temperature difference is equal to or higher than a certain temperature (e.g., equal to or higher than 2 degrees C.), the control means 12 shifts to a process of STEP 4.

In STEP 4, the control means 12 determines presence/absence of a thermo-OFF indoor unit. If the control means 12 determines that no thermo-OFF indoor unit is present, the control means 12 returns to the process of STEP 1. If the control means 12 determines that a thermo-OFF indoor unit is present, the control means 12 shifts to a process of STEP 5.

In STEP 5, the control means 12 forcedly causes the thermo-OFF indoor unit to operate for a given time period (e.g., 5 minutes) (hereinafter, forcible thermo-ON), and causes the conveying fan 14 to operate to convey an air-conditioning capacity of forcible thermo-ON to the air-conditioned space 5 for which the control determination temperature difference is determined to be large.

On the other hand, if the control means 12 determines that the control determination temperature difference falls within a certain range (e.g., a range from −1 degree C. to 2 degrees C.), the control means 12 shifts to a process of STEP 6.

In STEP 6, ETm becomes inconstant and linearly changes due to the temperature difference. It should be noted that the range of ETm is a range in which an air-conditioning capacity of 100% is provided and dehumidification is also possible. For example, when the temperature difference is 2 degrees C., ETm is 0 degrees C.; when the temperature difference is −1 degree C., ETm is 10 degrees C.; and ETm is interpolated linearly when the temperature difference is between them. This control is referred to as ET shift control A, ETm during this control is referred to as ETmA, and an upper limit ETmA is referred to as ETmAmax.

In STEP 7, the control means 12 determines control subsequent to ET shift control A on the basis of a relative humidity obtained by the humidity sensor. Here, for example, when the relative humidity is equal to or higher than 60%, the control means 12 returns to the process of STEP 1. When the relative humidity is lower than 60%, the control means 12 shifts to a process of STEP 8.

In STEP 8, the control shifts to ET shift control B in which a dehumidification capacity is unnecessary and energy saving is higher than in ET shift control A. ETm during this control is referred to as ETmB, and an upper limit ETmB is referred to as ETmBmax. For example, the indoor units are set so as to provide a capacity of 100% when the temperature of the temperature sensor is 27 degrees C. and ETm=0 degrees C., and ETmBmax is set at 0+(27−0)×(1−0.5)=13.5 degrees C. at which a capacity of 50% is provided without considering a dehumidification capacity. Here, ETmBmax>ETmAmax.

In STEP 9, the control means 12 determines presence/absence of a thermo-OFF indoor unit. If the control means 12 determines that no thermo-OFF indoor unit is present, the control means 12 shifts to a process of STEP 10.

In STEP 10, the control means 12 determines whether it is under the condition of ET shift control A. If the control means 12 determines that it is not under the condition of ET shift control A, the control means 12 returns to the process of STEP 1. If the control means 12 determines that it is under the condition of ET shift control A, the control means 12 returns to the process of STEP 7.

It should be noted that since the air-conditioned space changes every moment, even during execution of ET shift control B, as a result of passage of time, there is a possibility that the condition that operation is possible with ET shift control A or ET shift control B is no longer met. Thus, in this flowchart, it is determined in STEP 10 whether it is under the condition of ET shift control A.

On the other hand, if the control means 12 determines that a thermo-OFF indoor unit is present, the control means 12 shifts to a process of STEP 11.

In STEP 11, the control means 12 causes the thereto-OFF indoor unit to perform forcible thermo-ON for a given time period (e.g., 5 minutes), and determines that the control determination temperature difference is large and simultaneously causes the conveying fan 14 to operate to convey an air-conditioning capacity of forcible thermo-ON to the air-conditioned space 5. Then, the control means 12 shifts to STEP 12.

In STEP 12, the control shifts to ET shift control C in which the capacity per one indoor unit 1 is lower and the energy saving is higher than in ET shift control B. ETm during this control is referred to as ETmC, and an upper limit ETmC is referred to as ETmCmax. For example, when one thermo-ON indoor unit is present, one forcible thermo-ON indoor unit is present, and the two indoor units have the same capacity and when the thermo-ON indoor unit has operated with a capacity of 50% before shifting to STEP 12, the indoor units are set so as to provide a capacity of 100% when the temperature of the temperature sensor is 27 degrees C. and ET=0 degrees C., and ETmCmax is set at 0+(27−0)×(1−0.5/2 units)=20.25 degrees C. when a capacity of 50% is provided as a whole without considering a dehumidification capacity and a capacity of 25%(=50%/2 units) is provided per one unit. Here, ETmCmax>ETmBmax.

In STEP 13, the control means 12 determines that it is under the condition of ET shift control B. If the control means 12 determines that it is not under the condition of ET shift control B, the control means 12 returns to the process of STEP 10. If the control means 12 determines that it is under the condition of ET shift control B, the control means 12 returns to the process of STEP 9.

It should be noted that since the air-conditioned space changes every moment as described above, even during execution of ET shift control C, as a result of passage of time, there is a possibility that the condition that the operation is possible with ET shift control A or ET shift control B is no longer met. Thus, in this flowchart, it is determined in STEP 13 whether it is under the condition of ET shift control B.

FIG. 4 is a table showing an example when ETmCmax is reset. Resetting of ETmCmax will be described with reference to FIG. 4. It should be noted that in FIG. 4, a matrix is shown in which a thermo-ON indoor unit total capacity and a forcible thermo-ON indoor unit total capacity of are associated with each other, and ETmCmax is exemplified which is uniquely determined from the association therebetween.

Either one of the control means 12 or another device (e.g., control means provided in each indoor unit, a controller at the upper level of the air-conditioning system A, a controller that manages a plurality of outdoor units and the like in a centralized manner, etc.) which resets a target evaporating temperature on the basis of temperature and humidity data and control states of the outdoor unit 1 and the indoor units 6a and 6b acquires operation information from the indoor units. Then, the capacity and the number of each of thermo-ON indoor units and forcible thermo-ON indoor units are counted and converted to a total capacity for each of the thermo-ON indoor units and the forcible thermo-ON indoor units(=capacity×number of units). Then, ETmCmax is indicated by a matrix created with thermo-ON indoor unit total capacities and forcible thermo-ON indoor unit total capacities as shown in FIG. 4. For example, when the thermo-ON indoor unit total capacity is 5% and the forcible thermo-ON indoor unit total capacity is 5%, ETmCmax=20.25 degrees C. In addition, when the thermo-ON indoor unit total capacity is 10% and the forcible thermo-ON indoor unit total capacity is 5%, ETmCrmax=18 degrees C.

Due to this method, it is unnecessary to calculate ETmCmax. Thus, component for the calculation (e.g., expensive calculation means, etc.) is unnecessary, and the product cost is reduced accordingly. In addition, a time for the calculation is unnecessary, and thus the reaction becomes quick.

It should be noted that as forcible thereto-ON means, a set temperature of the indoor unit caused to perform forcible thereto-ON is set as the value of the temperature sensor. In the air-conditioning system A, during forcible thermo-ON, change of the set temperature from the remote control is invalidated such that an energy-saving operation is not impaired.

As described above, in the air-conditioning system A, necessity of the indoor units 6a and 6b is evaluated in STEP 2. If the indoor units 6a and 6b are unnecessary, the indoor units 6a and 6b are caused to perform thermo-OFF in STEP 3, whereby it is possible to achieve energy saving and it is possible to suppress excessive cooling to improve comfort. In other words, in the air-conditioning system A, when the air-conditioned space 5 has been cooled to the set temperature, the unnecessary indoor units are caused to perform thermo-OFF, whereby it is made possible to improve both energy saving and comfort.

In the air-conditioning system A, when the air-conditioning capacity is not sufficient, presence/absence of a thermo-OFF indoor unit is determined in STEP 4. If a thermo-OFF indoor unit is present, forcible thermo-ON is performed and the conveying fan 14 is operated in STEP 5. By so doing, although STEP 6 cannot be entered at normal time as a result of STEP 2, there is a possibility of establishing a condition of shifting to the process of STEP 6 for the next control by the control of this time (STEP 4). Thus, there is a possibility that energy saving is achieved. In addition, even in the case where STEP 6 cannot be entered, comfort is improved since the air-conditioning capacity of forcible thermo-ON is conveyed to the space for which the control determination temperature difference is large. In other words, in the air-conditioning system A, when the air-conditioned space 5 has not been cooled to the set temperature, the thermo-OFF indoor unit is caused to perform forcible thermo-ON and the conveying fan 14 is operated, whereby the possibility of improving energy saving is increased and it is possible to improve comfort.

In the air-conditioning system A, when an air conditioning load and the air-conditioning capacity come close to each other, ETmAmax>0 degrees C. is established by ET shift control A in STEP 6. Thus, it is possible to achieve higher energy saving than the case where ETm is constant as 0 degrees C.

In the air-conditioning system A, a relative humidity is determined in STEP 7. If it is determined that dehumidification is unnecessary, shift to ET shift control B is made in STEP 8. By so doing, ETmBmax>ETmAmax is established, and thus it is possible to achieve higher energy saving than in ET shift control A. In addition, in the air-conditioning system A, presence/absence of a thermo-OFF indoor unit is determined in STEP 9. If a thermo-OFF indoor unit is present, forcible thermo-ON is performed and the conveying fan is operated in STEP 11, thereby shifting to ET shift control C in STEP 12. By so doing, ETmCmax>ETmBmax is established, and thus it is possible to achieve higher energy saving than in ET shift control B. In other words, according to the air-conditioning system A, it is possible to positively shift to control that allows the air-conditioned space to be air-conditioned with small energy consumption.

As described above, in the air-conditioning system A, control is performed in which it is possible to sequentially shift to control corresponding to the environmental situation of the air-conditioned space while comfort is improved and maintained. Thus, it is possible to achieve improvement of comfort and energy saving.

Embodiment 2

The configuration of an air-conditioning system (hereinafter, referred to as air-conditioning system A1 for convenience) according to Embodiment 2 of the present invention will be described. It should be noted that in Embodiment 2, the difference from Embodiment 1 will be mainly described. In Embodiment 2 as well, FIG. 1 and FIG. 2 are used.

In the air-conditioning system A according to Embodiment 1, the capacities of the thermo-ON indoor unit and the forcible thermo-ON indoor unit are not particularly mentioned. However, in the air-conditioning system A1 according to Embodiment 2, control in the case where the capacities of the thermo-ON indoor unit and the forcible thermo-ON indoor unit are different from each other, will be described.

The case will be described where the thermo-ON indoor unit is the indoor unit 6a and the forcible thermo-ON indoor unit is the indoor unit 6b in FIG. 1. For example, when the thermo-ON indoor unit has operated with a capacity of 50% before shifting to STEP 12 in FIG. 2, the indoor units are set so as to provide a capacity of 100% when the temperature of the temperature sensor is 27 degrees C. and ETm=0 degrees C., and ETmCmax is set such that a capacity of 50% is provided as a whole without considering a dehumidification capacity.

Here, the case is assumed where the capacity of the indoor unit 6b is twice the capacity of the indoor unit 6a. If so, in STEP 12 that is executed by the air-conditioning system according to Embodiment 2, the capacity ratio=thermo-ON indoor unit:forcible thermo-ON indoor unit=1:2, it is only necessary to provide a capacity of 17%(=50%/3) per one unit, and thus 0+(27−0)×(1−0.5/3)=22.5 degrees C.

Next, the case is assumed where the capacity of the indoor unit 6b is 0.5 times of the capacity of the indoor unit 6a. If so, in STEP 12 that is executed by the air-conditioning system according to Embodiment 2, the capacity ratio=thermo-ON indoor unit:forcible thermo-ON indoor unit=1:0.5, it is only necessary to provide a capacity of 33%(=50%/1.5) per one unit, and thus 0+(27−0)×(1−0.5/1.5)=18 degrees C.

As described above, the air-conditioning system A1 according to Embodiment 2 sets ETmCmax in accordance with the capacity ratio between the thermo-ON indoor unit and the forcible thermo-ON indoor unit. Thus, in addition to the advantageous effects provided by the air-conditioning system A according to Embodiment 1, it is made possible to further achieve energy saving while comfort is maintained further.

Embodiment 3

Figure 5:
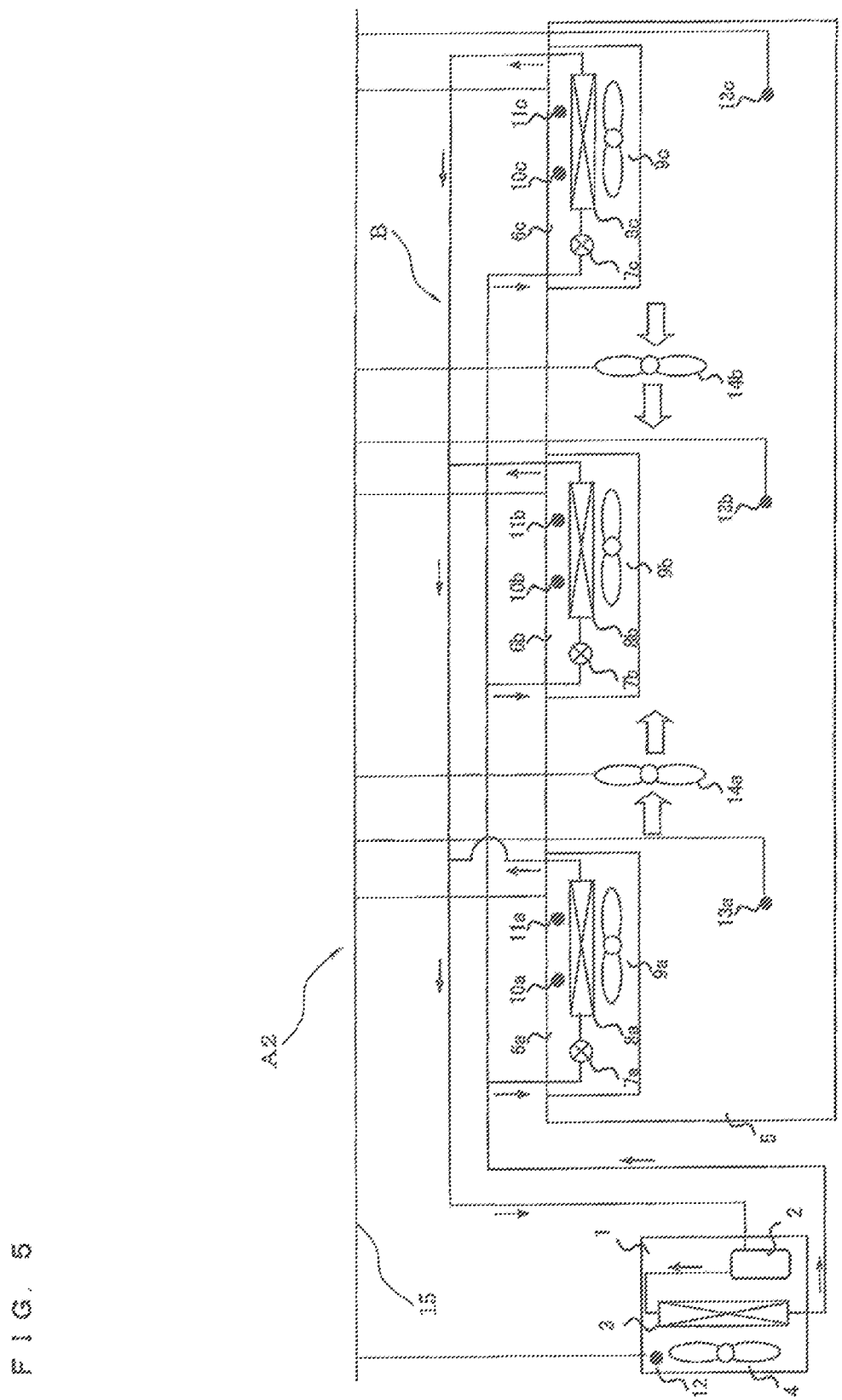
FIG. 5 is a schematic configuration diagram showing a schematic configuration of an air-conditioning system according to Embodiment 3 of the present invention.

FIG. 5 is a schematic configuration diagram showing a schematic configuration of an air-conditioning system A2 according to Embodiment 3 of the present invention. The air-conditioning system A2 according to Embodiment 3 will be described with reference to FIG. 5. The air-conditioning system A2 has a configuration in which an indoor unit 6c is further connected, namely, a configuration in which three indoor units are provided. It should be noted that in Embodiment 3, the difference from Embodiments 1 and 2 will be mainly described.

In the air-conditioning system A according to Embodiment 1 and the air-conditioning system A1 according to Embodiment 2, the number of the thermo-ON indoor units and the number of the forcible thermo-ON indoor units are not particularly mentioned. However, in the air-conditioning system A2 according to Embodiment 3, control in the case where the number of the thermo-ON indoor units and the number of the forcible thermo-ON indoor units are different from each other will be described.

The case will be described where the thermo-ON indoor unit is the indoor unit 6b and the forcible thermo-ON indoor units are the indoor units 6a and 6c in FIG. 5. For example, when the thermo-ON indoor units have operated with a capacity of 50% before shifting to STEP 12 in FIG. 2, the indoor units are set so as to provide a capacity of 100% when the temperature of the temperature sensor is 27 degrees C. and ETm=0 degrees C., and ETmCmax is set such that a capacity of 50% is provided as a whole without considering a dehumidification capacity.

Here, the case is assumed where the capacities of the indoor units 6a, 6b, and 6c are the same. If so, the unit number ratio=the capacity ratio=thermo-ON indoor unit:forcible thermo-ON indoor unit=1:2, it is only necessary to provide a capacity of 17%(=50%/3) per one unit, and thus 0+(27−0)×(1−0.5/3)=22.5 degrees C.

Next, the case is assumed where each of the capacities of the forcible thermo-ON indoor units 6a and 6c is 0.5 times of the capacity of the thermo-ON indoor unit 6b. If so, the unit number ratio=thermo-ON indoor unit:forcible thermo-ON indoor unit=1:2=>the capacity ratio=thermo-ON indoor unit:forcible thermo-ON indoor unit=1:2×0.5=1:1, it is only necessary to provide a capacity of 25%(=50%/2) per one unit, and thus 0+(27−0)×(1−0.5/2)=20.25 degrees C.

As described above, the air-conditioning system A2 according to Embodiment 3 sets ETmCmax in accordance with the unit number ratio between the thermo-ON indoor unit and the forcible thermo-ON indoor unit the capacity ratio. Thus, in addition to the advantageous effects provided by the air-conditioning system A according to Embodiment 1, it is made possible to further achieve energy saving while comfort is maintained further.

Incidentally, in each embodiment described above, in the case where the number of the thermo-ON indoor units is one, the case where the number of the indoor units is two or three and the case where the capacity ratio is 0.5 or 2 times have been described. However, it is possible to use the same control even with another number of the thermo-ON indoor units, another unit number ratio, and another capacity ratio. In addition, the case where the number of the outdoor units 1 is one has been described. However, it is possible to use the same control even in the case where the number of the outdoor units 1 is a plural number. In this case, the outdoor units may be connected in series or may be connected in parallel.

Embodiment 4

Figure 6:
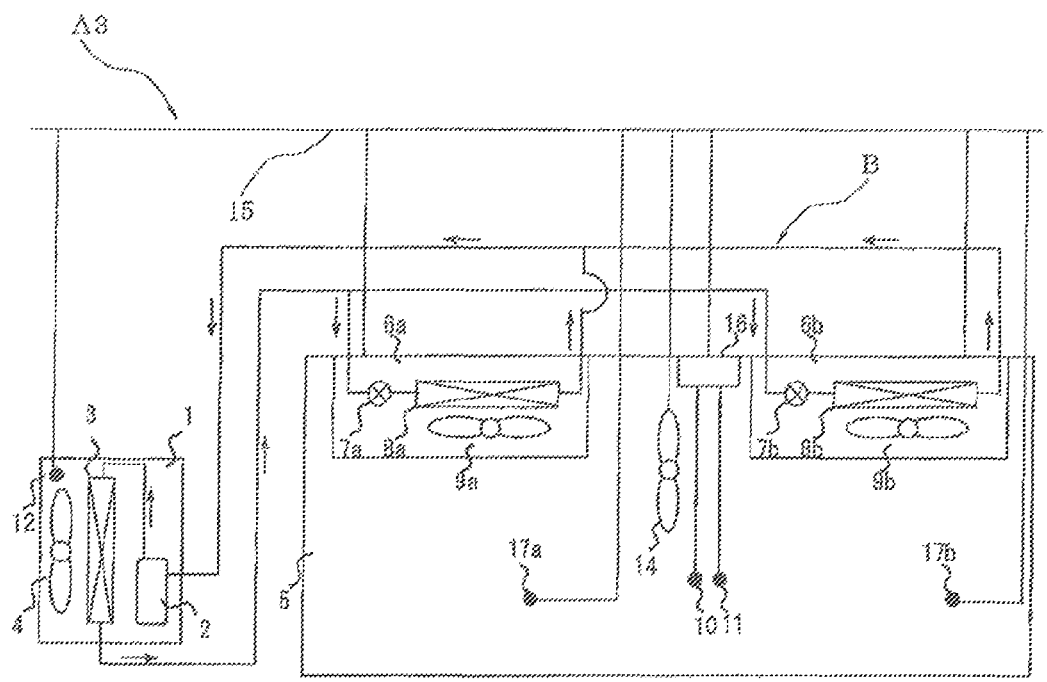
FIG. 6 is a schematic configuration diagram showing a schematic configuration of an air-conditioning system according to Embodiment 4 of the present invention.

FIG. 6 is a schematic configuration diagram showing a schematic configuration of an air-conditioning system A3 according to Embodiment 4 of the present invention. The air-conditioning system A3 according to Embodiment 4 will be described with reference to FIG. 6. The air-conditioning system A3 has a configuration in which a temperature sensor 10 and a humidity sensor 11 are provided at optional locations within the air-conditioned space 5. It should be noted that in Embodiment 4, the difference from Embodiments 1 to 3 will be mainly described.

In Embodiments 1 to 3, the configuration has been described in which the temperature sensor 10 (the temperature sensors 10a, 10b, and 10c) and the humidity sensor 11 (the humidity sensors 11a, 11b, and 11c) are connected within the indoor unit 6 (the indoor units 6a, 6b, and 6c). Meanwhile, in Embodiment 4, as shown in FIG. 6, a configuration is employed in which the temperature sensor 10 and the humidity sensor 11 are provide at optional locations within the air-conditioned space 5. In addition, a converter 16 for communicating sensor data with the temperature sensor 10 and the humidity sensor 11 is provided in the air-conditioned space 5. The communication line 15 is connected to the converter 16. Thus, the control means 12 performs control on the basis of information input from the converter 16 via the communication line 15.

In addition, the temperature sensor 10 and the humidity sensor 11 may be provided within the remote controls 17a and 17b, respectively. Even when the remote controls 17a and 17b including the temperature sensor 10 and the humidity sensor 11 as described above are connected and control is performed with temperature and humidity sensor data obtained by the remote controls 17a and 17b, the same control is performed. In the case where the temperature sensor 10 and the humidity sensor 11 are provided within the remote controls 17a and 17b, respectively, the converter 16 may not be provided.

As described above, in the air-conditioning system A3 according to Embodiment 4, as compared to Embodiments 1 to 3, it is possible to provide the temperature sensor 10 and the humidity sensor 11 at positions within the air-conditioned space 5 which are close to a location where a person feels. Thus, according to the air-conditioning system A3 according to Embodiment 4, it is possible to perform control with a temperature close to the feeling temperature, and it is possible to further improve comfort.

It should be noted that control (flow of the refrigerant of the air-conditioning apparatus during cooling, etc.) in Embodiment 4 is the same as described in Embodiment 1. In addition, the basic functions of the remote controls 17a and 17b are the same as those of the remote controls 13a and 13b.

REFERENCE SIGNS LIST 1 outdoor unit 2 compressor 3 outdoor heat exchanger 4 outdoor fan 5 air-conditioned space 6a indoor unit 6b indoor unit 6c indoor unit 7a indoor electronic expansion valve 7b indoor electronic expansion valve 8a indoor heat exchanger 8b indoor heat exchanger 9a indoor fan 9b indoor fan 10a temperature sensor 10b temperature sensor 10c temperature sensor 11a humidity sensor 11b humidity sensor 11c humidity sensor 12 control means 13a remote control 13b remote control 14 conveying fan 15 communication line 16 converter 17a remote control 17b remote control A air-conditioning system A1 air-conditioning system A2 air-conditioning system B air-conditioning apparatus

The invention claimed is:

1. An air-conditioning system comprising:
an air-conditioning apparatus in which two or more indoor units are connected to at least one outdoor unit;
a conveying fan conveying conditioned air; and
a controller configured to control the air-conditioning apparatus and the conveying fan on a basis of a preset target evaporating temperature, wherein
each of the indoor units performs thermo-ON or thermo-OFF in accordance with a temperature of an air-conditioned space which is individually measured, and
the controller resets an upper limit of the target evaporating temperature when: a control determination temperature difference which is a difference between a set temperature and the temperature of the air-conditioned space is within a predetermined range; a humidity of the air-conditioned space is equal to or lower than a predetermined value; and a thermo-ON indoor unit and a thermo-OFF indoor unit are present together in the same air-conditioned space, wherein
the controller forcibly causes the thermo-OFF indoor unit to perform thermo-ON and simultaneously causes the conveying fan to operate before resetting the target evaporating temperature.

2. The air-conditioning system of claim 1, wherein
the controller calculates a necessary capacity per one unit on a basis of a total capacity of the thermo-ON indoor unit and a total capacity of the thermo-OFF indoor unit and resets the upper limit of the target evaporating temperature so as to meet the necessary capacity.

3. The air-conditioning system of claim 1, wherein
the controller forcibly causes the thermo-OFF indoor unit to perform thermo-ON by causing a set temperature of an indoor unit forcibly caused to perform thermo-ON to be a value of a temperature within the air-conditioned space.

4. The air-conditioning system of claim 1, wherein
the controller resets the target evaporating temperature to a value associated with a total capacity of the thermo-ON indoor unit and a total capacity of an indoor unit forcibly caused to perform thermo-ON.

5. The air-conditioning system of claim 1, wherein
the controller resets the target evaporating temperature in accordance with a capacity ratio between the thermo-ON indoor unit and an indoor unit forcibly caused to perform thermo-ON.

6. The air-conditioning system of claim 1, wherein the controller resets the target evaporating temperature in accordance with a unit number ratio between the thermo-ON indoor unit and indoor unit forcibly caused to perform thermo-ON.

7. The air-conditioning system of claim 1, wherein a temperature sensor measuring the temperature of the air-conditioned space and a humidity sensor measuring the humidity of the air-conditioned space are provided in each indoor unit.

8. The air-conditioning system of claim 1, wherein a temperature sensor measuring the temperature of the air-conditioned space and a humidity sensor measuring the humidity of the air-conditioned space are provided in the air-conditioned space.

9. The air-conditioning system of claim 8, wherein a converter communicating with the temperature sensor and the humidity sensor is provided in the air-conditioned space, and information measured by the temperature sensor and the humidity sensor is input to the controller via the converter.

10. The air-conditioning system of claim 8, further comprising a remote control in which the temperature sensor and the humidity sensor are provided, wherein information measured by the temperature sensor and the humidity sensor is input to the controller via the remote control.

11. The air-conditioning system of claim 1, wherein the controller calculates a necessary capacity per one unit on a basis of a total capacity of the thermo-ON indoor unit and a total capacity of the thermo-OFF indoor unit and resets the upper limit of the target evaporating temperature so as to meet the necessary capacity.

12. The air-conditioning system of claim 2, wherein the controller forcibly causes the thermo-OFF indoor unit to perform thermo-ON by causing a set temperature of an indoor unit forcibly caused to perform thermo-ON to be a value of a temperature within the air-conditioned space.

* * * * *